United States Patent [19]
Kou

[11] 3,874,537
[45] Apr. 1, 1975

[54] ROAD VEHICLE OF THE PLATFORM TYPE

[76] Inventor: Jean Kou, 15, Rue Sassier Leroy, Paris, France

[22] Filed: Oct. 23, 1973

[21] Appl. No.: 408,932

[52] U.S. Cl. ............................. 214/501, 214/515
[51] Int. Cl. .......................................... B60p 1/14
[58] Field of Search ............ 214/515, 505, 501, 314

[56] References Cited
UNITED STATES PATENTS

| | | | |
|---|---|---|---|
| 3,130,847 | 4/1964 | Dempster | 214/505 |
| 3,145,009 | 8/1964 | French | 214/515 X |
| 3,362,552 | 1/1968 | Thiele | 214/515 |
| 3,819,075 | 6/1974 | Derain | 214/515 |
| 3,825,137 | 7/1974 | Mackrill | 214/515 |

*Primary Examiner*—Robert B. Reeves
*Assistant Examiner*—Thomas E. Kocovsky

[57] ABSTRACT

A road vehicle adapted to carry a container or to act as a tipping wagon comprising an auxiliary chassis adapted to carry the container and pivotally secured to the main chassis of the vehicle around an axis extending across the rear end of the latter. A single jack system controls selectively a lever adapted to draw a container lying on the ground to the rear of the vehicle onto the auxiliary chassis and to shift the container back onto the ground, and the tilting of the auxiliary chassis when the vehicle is to serve as a tipping wagon.

7 Claims, 8 Drawing Figures

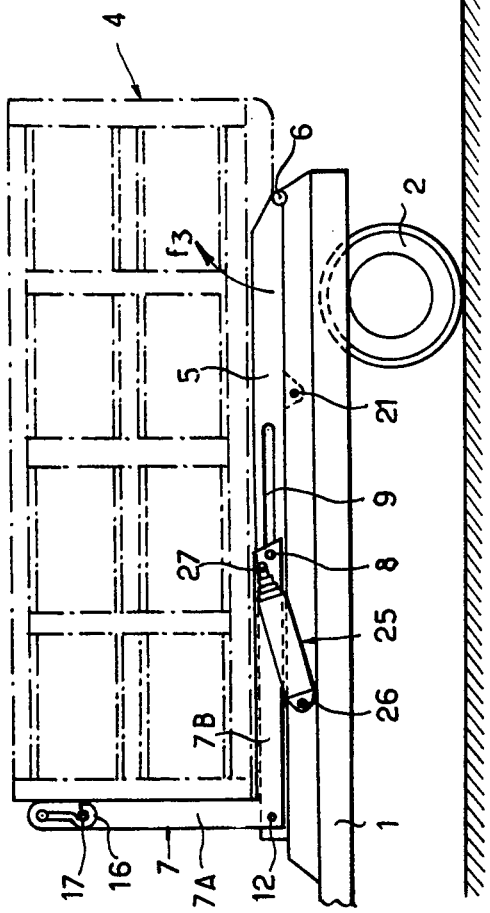
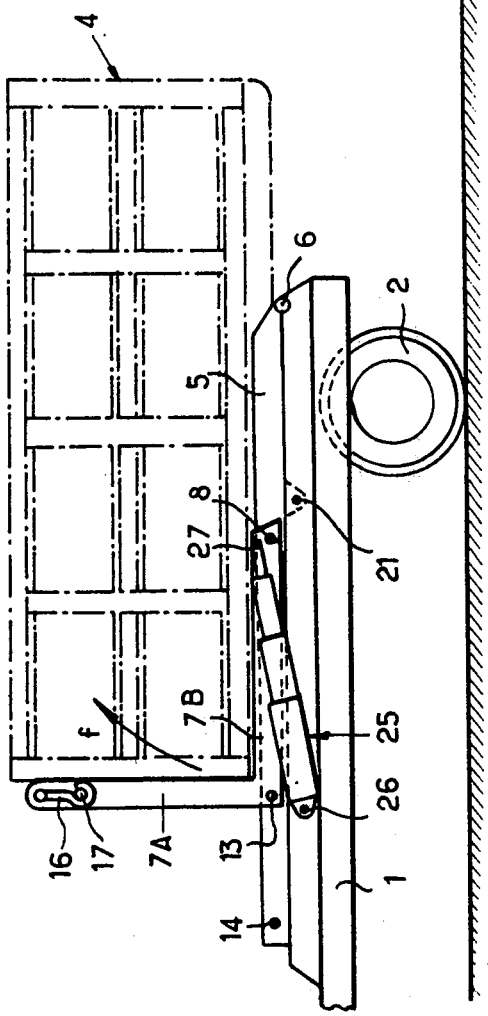

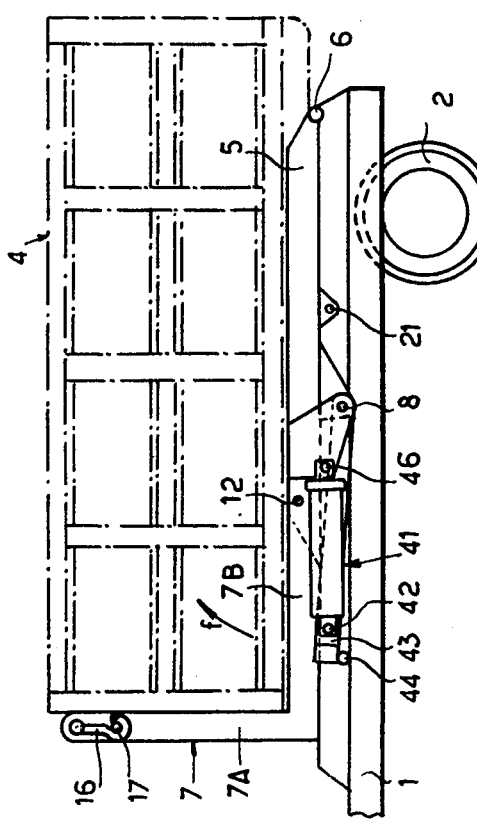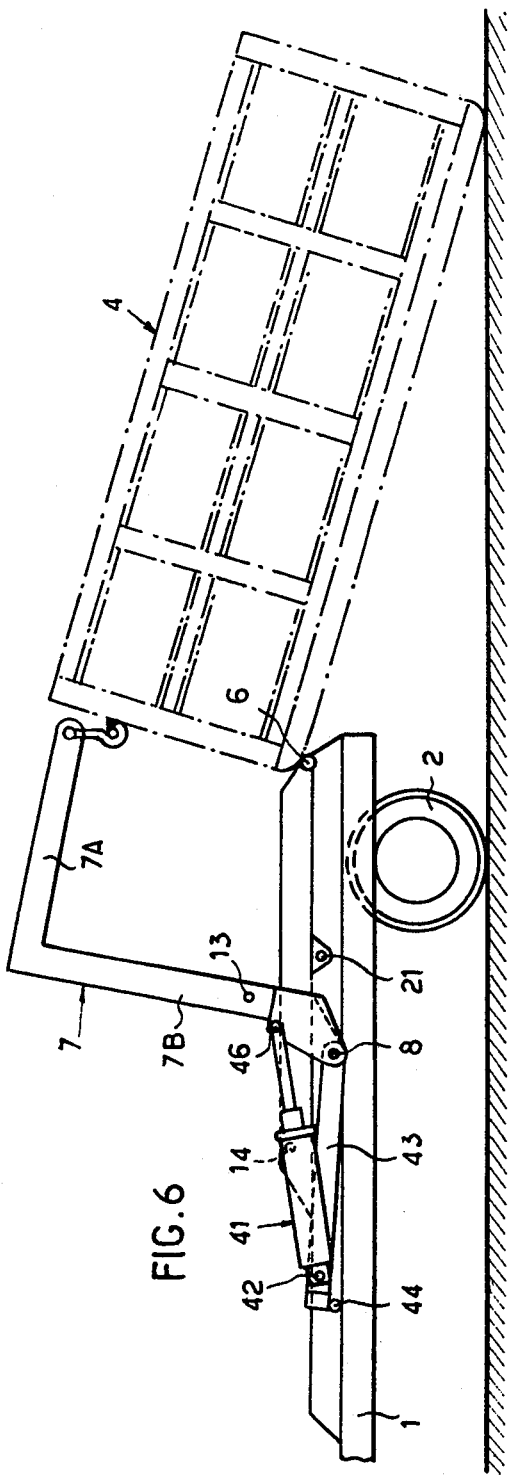

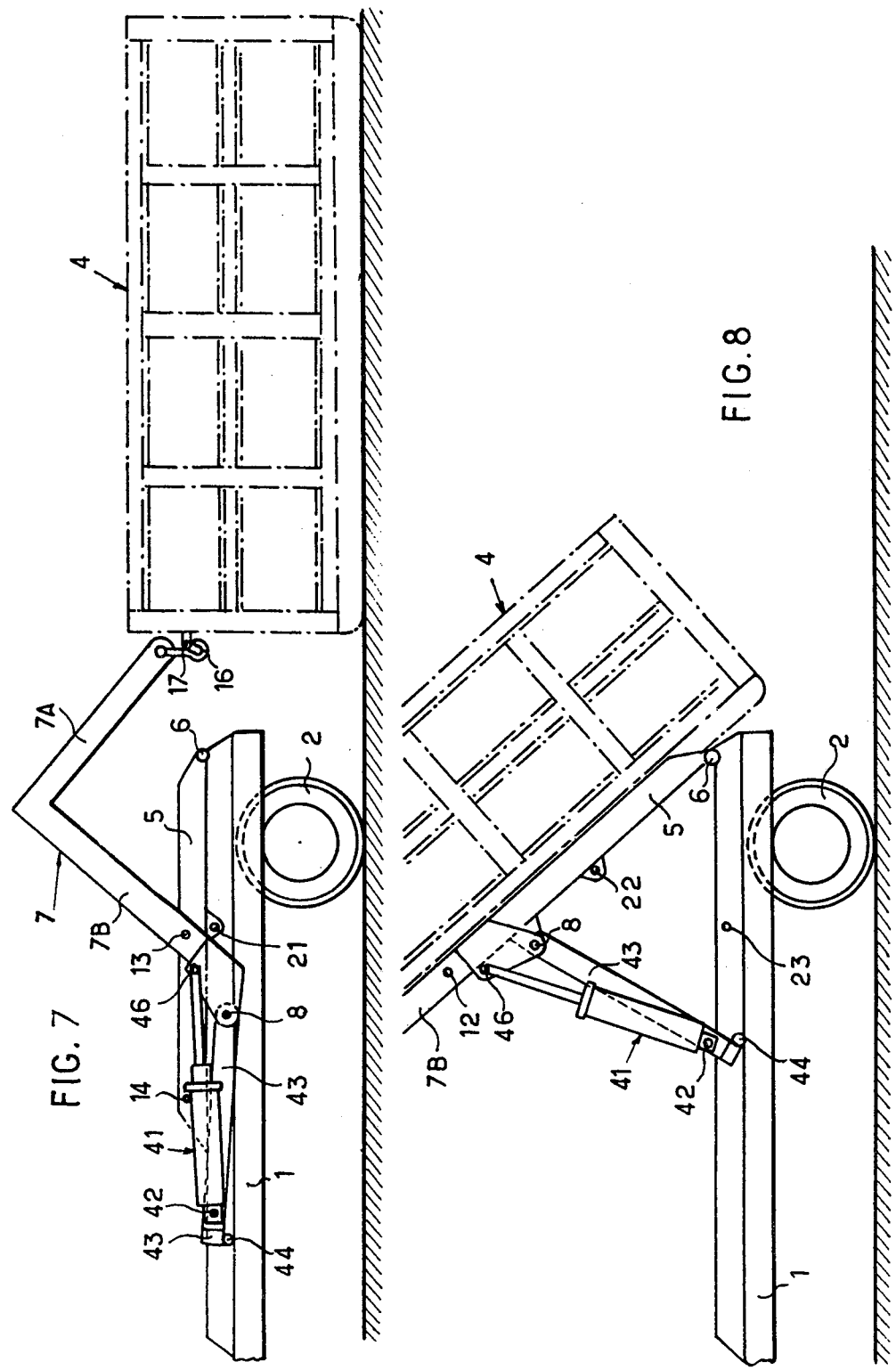

ROAD VEHICLE OF THE PLATFORM TYPE

The present invention relates to apparatus for loading a container on a platform-carrying road vehicle, such as a wagon or a trailer and for transferring such a container off the vehicle onto the ground without resorting to any external appliance.

The invention relates more particularly to arrangements of this type including a lever adapted to pivot on the vehicle chassis around a transverse horizontal axis, so that the free end of said lever is shifted during said pivotal movement from the rear to the front of the vehicle and reversely, said lever engaging one end of the container, the other end of which slides over the ground and over the vehicle platform; according to a modification in the use of the arrangement, the container may assume a suitably controlled pivotal motion around a horizontal axis extending across the rear of the vehicle.

With such a simple arrangement, a container can be loaded on a vehicle by merely bringing the rear of the vehicle into engagement with one end of said container and then raising said end of the container through the pivoting lever the free end of which has been for this puprose secured to said end of the container adjacent the vehicle; thus, the container slides firstly over the ground to the rear of the vehicle and then over the rear part of the vehicle platform so as to finally rest completely on the latter when the pivoting lever has reached its foremost position. The unloading is executed quite as easily through a reversed rearward motion of the pivoting lever, which firstly ensures a sliding of the container over the vehicle platform followed by its lowering and sliding over the ground on which it lies finally flat to the rear of the vehicle. Furthermore, it is possible, if desired, instead of placing the container on the ground, to make the container rock until it assumes an inclined position whereby the vehicle is transformed into a tapping wagon.

However, in all prior arrangements of this type, there are provided for the control of the rearward rocking of the container after the manner of a tiltable emptying skip, comparatively intricate mechanisms resorting to auxiliary control means independent of those which ensure the sliding of the container off the vehicle onto the ground and reversely.

The purpose of the present invention consists in providing a simpler arrangement through which the same results may be obtained.

To this end, the horizontal transverse axis forming the pivot for the operating lever extends, according to the invention, across an auxiliary chassis carried in turn pivotally at the rear end of the vehicle chassis while locking means are provided for selectively making the auxiliary chassis rigid with the operating lever and with the vehicle chassis, the means controlling the tilting of the container being the same as those controlling the pivotal movement of the lever.

Thus, with such common controlling means, it is possible either to make the lever pivot when the auxiliary chassis is rigid with the vehicle chassis, or else to tilt the container when the auxiliary chassis is rigid with the lever. The arrangement is thus much simpler than the known arrangements which require two different systems controlling respectively the movement of the container between the vehicle and ground and its tilting.

The invention also covers road vehicles provided with a platform equipped with such container-loading and unloading means.

The invention will now be described in further detail, reference being made to the accompanying drawings illustrating by way of example two embodiments of the improved arrangement according to the invention. In said drawings:

FIG. 1 is a diagrammatic-side view of the rear end of a road vehicle equipped with said improved arrangement shown in the position assumed by it during transportation;

FIGS. 2 and 3 illustrate the same arrangement during a loading or unloading procedure and while the container is lying on the ground respectively;

Figure 3:
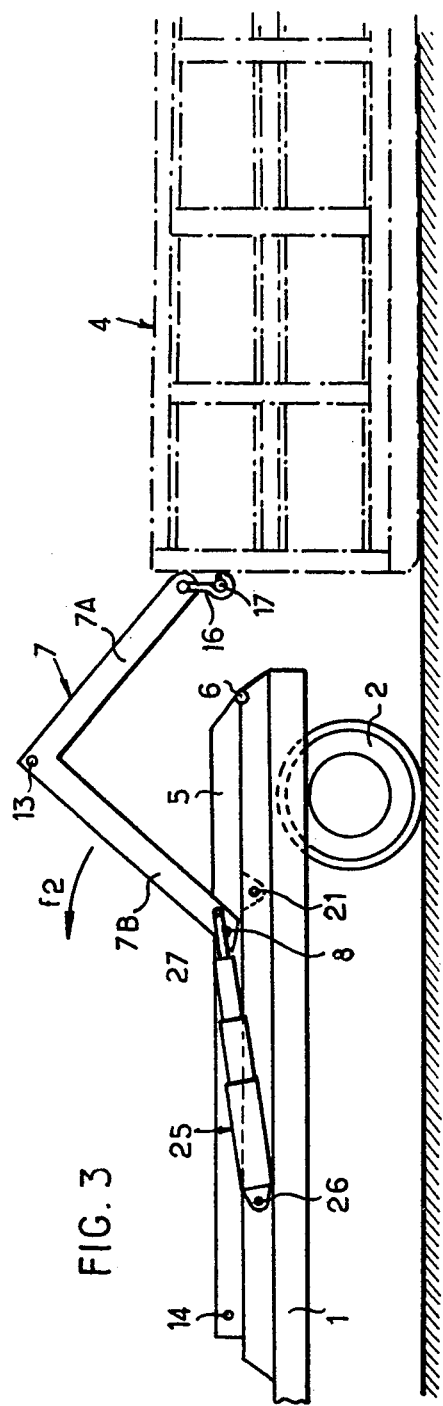

FIG. 4 again illustrates the same embodiment with the auxiliary chassis raised so as to form a tipping wagon;

FIG. 5 is a diagrammatic side view of another embodiment;

FIGS. 6 and 7 show two different positions of the last-mentioned embodiment during a loading or unloading procedure; and FIG. 8 shows the same embodiment in its tilted position.

The road vehicle whose rear end is illustrated in FIG. 1 can be a wagon, a trailer or the like. Said rear end carries the reference number 1 while the rear wheels are shown at 2.

The vehicle is equipped with an independent mechanism for loading and unloading containers such as 4, said mechanism including chiefly an auxiliary chassis 5 (see also FIG. 4) adapted to pivot around a rear horizontal transverse axle 6 extending across the rear end of the vehicle chassis 1. A square-shaped lever 7 is carried by a horizontal transverse spindle 8 adapted to slide along a longitudinal slideway 9 formed in the auxiliary chassis 5.

The pivoting lever 7 occupies, during transportation, the inoperative position illustrated in FIG. 1, for which one arm 7 A of the square-shaped lever 7 is directed vertically along the front end of the auxiliary chassis, while its other arm 7 B extends horizontally and rearwardly. Said pivoting lever may be locked in this inoperative position through any suitable means, such as a pin 12 engaging simultaneously a hole 13 in the arm 7 B and a hole 14 in the auxiliary chassis 5. The upper end of the arm 7 A of the square-shaped lever is provided with a pivoting hook 16 adapted to engage a co-operating strap 17 secured to one end at least of the container 4.

Figure 4:
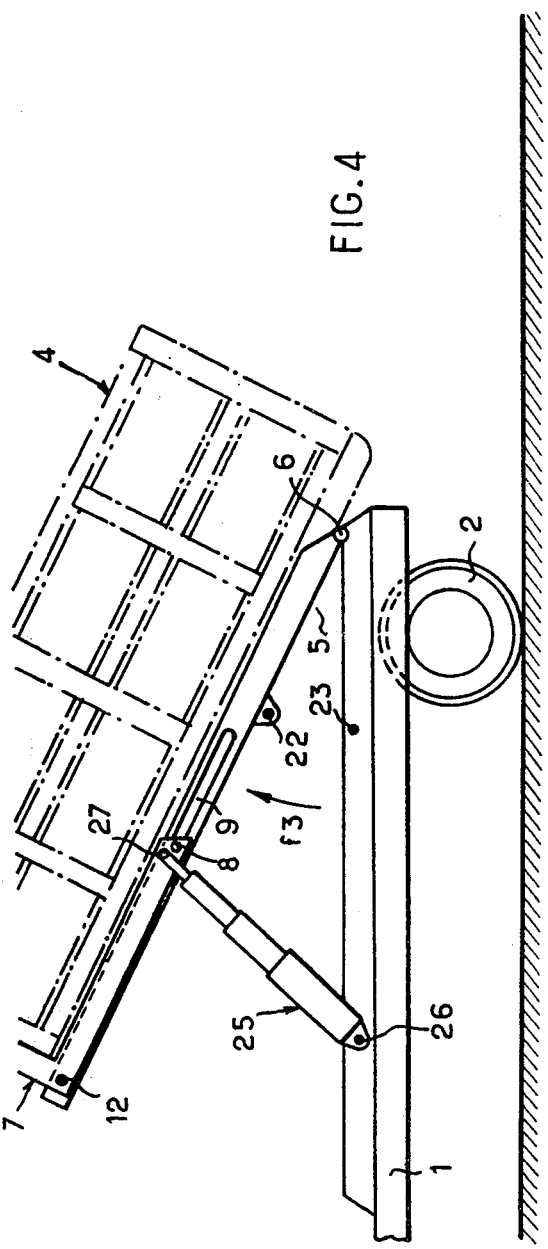

The auxiliary chassis 5 may be locked in its horizontal position on the main chassis by any suitable means such as a pin 21 engaging simultaneously a hole 22 in the auxiliary chassis 5 and a hole 23 in the vehicle chassis 1 (FIG. 4).

A double-acting jack operated by a compressed fluid, preferably a telescopic hydraulic jack 25, is pivotally secured at one end to the chassis 1 at 26 and at its other end to the pivoting lever 7 at 27. This jack plays a threefold part, to wit : it controls the movements of the lever arm 7 B along the slideway 9 on the auxiliary pivoting chassis 5, the pivotal movement of said lever around axis 8 and, when required, the pivotal movement of the auxiliary chassis 5 with reference to the vehicle chassis 1 around the axis 6.

The operation of the arrangement is as follows:

The vehicle being at a standstill whether empty or loaded with the container 4, the different parts occupy the positions illustrated in FIG. 1. If it is desired, for instance, to lay the container 4 on the ground, the pin 21 is left in position and the pin 12 is removed; after which, the jack 25 is fed in a manner such as will increase its length whereby the lever 7 is shifted horizontally along the slideway 9 and the container is caused to recede over the vehicle chassis until it enters the position illustrated in FIG. 2. When said position is reached, the continued increase in length of the jack 25 causes the lever 7 to rock around its transverse axis 8 in the direction of the arrow $f$ (FIG. 2). During this last stage, the front end of the container is raised with the pivoting lever while its rear end slides over the rear edge of the vehicle platform and lowers towards the ground and, finally, enters the position illustrated in FIG. 3 for which the outermost end of the pivoting lever has lowered sufficiently for its hook to allow the front end of the container to engage the ground.

When it is desired to raise a container resting on the ground onto the vehicle, the vehicle is first caused to recede until its rear end is near the container as illustrated in FIG. 3. The pivoting lever 7 is set in the position illustrated in FIG. 3, the jack 25 is fed with fluid and so as to be retracted while the transverse pivotal axis 8 of the lever is held fast on the auxiliary chassis, so as to prevent it from moving towards the front of the vehicle. The operation of the jack first raises through a pivotal movement of the lever 7, the end of the container hooked onto the end of the lever 7, following which the far end of the container slides over the ground and the bottom of the container slides over the rear edge of the auxiliary chassis until the container reaches the position illustrated in FIG. 2. This being done, the pivotal axis 8 is released through any suitable means so that the continued shortening of the jack causes the arm 7 B of the lever to slide forwardly along the slideway 9 until the container reaches its final road transportation position illustrated in FIG. 1.

The same equipment may allow the vehicle to act as a tipping wagon. To this end, it is sufficient to insert a spindle at 12 and to remove the spindle at 21 whereupon an increase in length of the jack 25 causes the auxiliary chassis 5, now released, to pivot around its transverse axis 6 in the direction illustrated by the arrow $f3$ (FIG. 4), so that the container takes the position illustrated in FIG. 4. To return the tipping wagon mechanism to its horizontal position, it is obviously sufficient to feed the jack 25, so as to retract it until the position illustrated in FIG. 1 is reached. The same jack 25 serves thus for controlling both the shifting and the tilting of the container.

FIG. 5 shows further, slightly different embodiment which allows the same results to be achieved. Said embodiment includes, as precedingly, the main chassis 1, the auxiliary pivoting chassis 5, the lever 7 pivotally secured at 8 to the auxiliary chassis; however in this last embodiment, the pivot 8 can no longer slide along the auxiliary chassis and the mechanism-controlling jack 41 is fitted in a different manner, to wit that disclosed in the first addition No. 84,519 dated Oct. 14, 1963 to the French Pat. No. 1,347,894.

One end of the double acting hydraulic jack 41 is pivotally secured at 42 to the ends of the two parallel links 43 adapted to slide or, better still, to roll on the rollers 44 along the vehicle chassis 1; the opposite ends of these links are pivotally secured to the pivotal spindle 8 connecting the lever 7 with the auxiliary chassis 5 or possibly to another point of the latter. The other end of said jack is pivotally secured to the pivoting lever 7 at a point 46 at a short distance from its pivotal spindle 8.

The auxiliary chassis 5 may also be secured, as precedingly, to the main chassis 1 by a pin 21 and the pivoting lever 7 may be similarly secured to the auxiliary chassis 5 by a pin 12, which latter is inserted at a point to the rear of that proposed for the preceding embodiment.

The operation of this second embodiment is as follows:

When inoperative or during transportation, the different parts occupy the positions illustrated in FIG. 5. If it is desired, for instance, to place a loaded container in the vehicle, the pin 21 is left in its operative position and the pin 12 is removed. The jack 41 is fed, so as to make its length increase, which causes the lever 7 to pivot in the direction of the arrow $f$ around the stationary pivot 8. The lever 7 passing through the intermediate position illustrated in FIG. 6 enters finally the position illustrated in FIG. 7 for which the container is laid on the ground. For the loading of a container, the operation is reversed, the jack being then fed, so as to be retracted.

When the vehicle is to serve as a tipping wagon, the pin 12 is left in its operative position while the pin 21 is removed. The jack 41 is fed so that its length increases whereby the rollers 44 carried by the ends of the links 43 roll over the main chassis 1, while the auxiliary chassis 5 rocks around its axis 6 and rises together with the container or with a skip until it reaches the emptying position illustrated in FIG. 8. The retraction of the jack thereafter causes the return of the auxiliary chassis and of its load into the horizontal transportation position.

Obviously, the invention is not limited to the embodiments described and illustrated and any desired modifications may be brought thereto as required by the applications to be considered, without departing from the scope of the accompanying claims.

What I claim is:

1. In a road vehicle adapted to removably carry a load and having a main chassis, an improvement comprising a controlling mechanism including an auxiliary load-carrying chassis extending over the main chassis and pivotally connected to the main chassis around an axis extending transversely across the rear end of said main chassis, a lever adapted to engage at one end the front end of the load to be carried by the main chassis and pivotally secured through its other end to the auxiliary chassis, single control means controlling selectively the pivotal movement of the auxiliary chassis around its axis and the pivotal movement of the lever and therethrough the shifting of the load between the ground and the upper surface of the auxiliary chassis and means for locking selectively the lever on the auxiliary chassis and the auxiliary chassis on the main chassis.

2. A controlling mechanism as claimed in claim 1, wherein the lever is pivotally secured to the auxiliary chassis through pivotal means adapted to slide longitudinally on said auxiliary chassis over a predetermined length under the action of the single control means.

3. A controlling mechanism as claimed in claim 1, wherein the single control means includes a jack pivotally connected to the lever at one end and to the main chassis at its other end, one of the pivotal connections respectively between the lever and the auxiliary chassis and the jack with the main chassis being adapted to slide longitudinally of the corresponding chassis.

4. A controlling mechanism as claimed in claim 1, wherein the lever is pivotally secured to the auxiliary chassis through pivotal means adapted to slide longitudinally on said auxiliary chassis under the action of the single control means, said single control means including a jack pivotally connected to the lever at one end and the other end of which is adapted to slide longitudinally along the main chassis.

5. A controlling mechanism as claimed in claim 1, wherein the single control means includes a jack pivotally connected to the lever at one end at a point near the pivotal connection between the lever and the auxiliary chassis, the mechanism including furthermore at least one link extending parallel to the longitudinal axis of the main chassis, said link having end portions which are pivotally secured respectively to the other end of the jack and to the auxiliary chassis, and means constraining the outer end of said link beyond its point of connection with the jack to run longitudinally over the surface of the main chassis.

6. A controlling mechanism as claimed in claim 1, wherein the lever is square-shaped and includes a first arm adapted to engage the major part of the height of the load to be carried and a second arm adapted to engage a large fraction of the length of the underside of said load.

7. A controlling mechanism as claimed in claim 1, wherein the first-mentioned end of the lever and the cooperating end of the load include interengageable hooking means.

* * * * *